Figure 1:
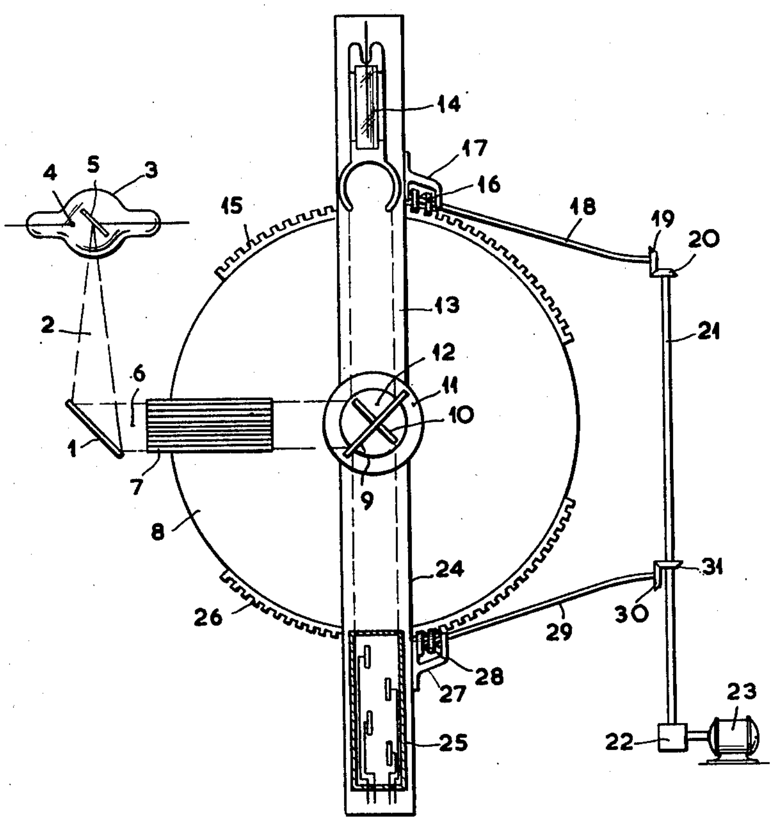

Oct. 23, 1962 S. WYTZES 3,060,314

DEVICE FOR X-RAY SPECTROCHEMICAL ANALYSIS
BY MEANS OF FLUORESCENT RADIATION

Filed June 15, 1959 2 Sheets-Sheet 1

INVENTOR
SJOERD WIJTZES

BY [signature]
AGENT

INVENTOR
SJOERD WIJTZES

BY
AGENT

United States Patent Office 3,060,314

Patented Oct. 23, 1962

1

3,060,314

DEVICE FOR X-RAY SPECTROCHEMICAL ANALYSIS BY MEANS OF FLUORESCENT RADIATION

Sjoerd Wytzes, Eindhoven, Netherlands, assignor to North American Philips Company, Inc., New York, N.Y., a corporation of Delaware

Filed June 15, 1959, Ser. No. 820,377
Claims priority, application Netherlands June 16, 1958
6 Claims. (Cl. 250—51.5)

For examining the composition of materials use is made of X-ray spectro-chemical analysis by means of fluorescent radiation which is produced when placing an object in the beam of an X-ray tube and irradiating it with X-rays of a sufficiently short wave-length. The X-ray spectrometer, by means of which spectral analysis of the fluorescent radiation thus obtained occurs, comprises a monocrystal for separating radiations of different wave-lengths and a measuring chamber which collects beams resulting from diffraction.

X-ray spectrometers for fluorescent analysis are known, in which the measuring chamber is a gas-filled counter tube or a scintillating counter. The properties of both meaesuring chambers differ in such a sense that the gas-filled counter tube is better suited than the scintillation counter to record the fluorescent radiation of a given series of elements, and the scintillation counter is to be preferred for the fluorescent radiation of elements of higher atomic number.

A proportional Geiger-Müller counter tube is employed for materials, the atomic number of which approximately amounts to 47 as a maximum. The absorption of the fluorescent radiation of this element in the gas volume of such a counter tube amounts to approximately 10% only. The fluorescent radiation of heavier elements is still less absorbed so that satisfactory registration is no longer feasible. An expedient for tracing these elements is the scintillation counter. This counter collects all radiations but has a limitation in that the required photo-emission amplification entails disturbance phenomena which are termed noise, so that the radiation to be recorded should have a given minimum energy to obtain a perceptible indication. Indication of fluorescent radiation of materials having an atomic weight lower than that of silver (41) is more difficult as the materials are lighter in weight.

A further difficulty is that the same reflection crystal is preferably not always used, but crystals having different interlattice-plane distances for different ranges of wave-lengths.

The present invention has for its object to provide a device which, notwithstanding difficulties, permits reliable measurement results to be obtained in a measuring range which extends over a wavelength range largely exceeding that to which each measuring chamber is suited separately. It concerns a device for spectro-chemical analysis of materials by means of X-rays. The device comprises an X-ray spectrometer for analyzing the fluorescent radiation of an object placed in the X-ray beam, in which the fluorescent radiation is incident on a mono-crystal surface and a measuring chamber is positioned in the direction of the reflected rays. In accordance with the invention, the mono-crystal surface consists of two parts, the lattice constants of which are different, a gas-filled counter tube being oriented in the direction of the rays deflected with the highest lattice constant by the mono-crystal surface and a scintillation counter being arranged in the direction of the rays deflected by the crystal surface with the smallest interlattice-plane distance. Measurements are carried out by means of either counter, but by simultaneously varying for both measuring chambers the angle

2 of reflection of the radiation to be measured it is easy to pass over from one measuring chamber to the other.

The invention also comprises a device for investigating elements, the wavelengths of the fluorescent radiation of which exceed 3 A. with the use of means for reducing the radiation absorption between the object and the measuring chamber. Radiations of a wavelength exceeding 3 A. are largely absorbed in air and for this reason it has been proposed to remove the air, so that the radiation passes through an evacuated space, or to replace the air by a gas by which the absorption of fluorescence radiation is relatively low. To this end helium and hydrogen enter into account. In such a device, in accordance with the invention, the mono-crystals and the Geiger-Müller counter tube are provided in a chamber, whereas the scintillation counter is situated outside this chamber.

In order that the invention may be readily carried into effect, examples will now be described in detail with reference to the accompanying drawings, in which FIG. 1 shows a diametrical array of the two measuring chambers, and FIGS. 2 and 3 relate to a device comprising a space which is separated from the open air.

FIG. 1 shows an X-ray spectrometer for fluorescent radiation from an object 1 which is placed in the cone of rays 2 of an X-ray tube 3. The X-ray tube 3 comprises an incandescent cathode 4 and an anode 5. The means required for heating the cathode and for operating the X-ray tube have been omitted in the drawing.

From the fluorescent radiation of the object 1 a narrow radiation beam 6 is separated by means of the collimator 7. This may be made up of flat, thin plates arranged parallel to each other with small interstices. Other known directing members, for example bunched thin metal tubes may also be used. The collimator 7 may be secured to a stationary table 8 which also carries the other component parts of the spectrometer.

The spectrometer comprises two crystal plates 9 and 10 consisting of materials, the crystal structures of which are known and the lattice constants of which are different. They are secured to supports 11, 12 which are supported by the table 8 so as to be rotatable in opposite direction relatively to the table 8. The support 11 for the crystal plate 9 moves simultaneously with an arm 13 carrying the Geiger-Müller counter tube 14. This arm is adjusted relatively to the crystal plate 9 so that the fluorescent radiation of the beam 6, after reflection in the crystal lattice of the plate 9, is deflected in the direction of the counter tube 14. In the position of the counter tube as shown in the drawing, the axis extends at right angles to the beam 6, while the crystal plate 9 is set at an angle of 45° relatively to these two directions.

The periphery of the table 8 is provided with a rack 15 meshed with a worm 16. The arm 15 has secured to it a shaped member 17 carrying the worm 16. This worm is driven by a flexible shaft 18 which is coupled through gears 19 and 20 to the shaft 21. Through a retarding mechanism 22 the shaft 21 is driven from the motor 23. The arm 13 may alternatively be driven in some other known way. The arm moreover carries along the support 11 for the crystal plate 9. While the arm 13 rotates through 180° the crystal has to be rotated through an angle of 90°. The difference in speed of rotation of the arm 13 relative to the support 11 for the crystal plate 9 is produced, in a manner not shown in the drawing, by a mechanism of known structure of a type also used in other commercial X-ray-spectrometry apparatus.

The support 12 for the crystal plate 10 is coupled in a corresponding manner to the rotatory arm 24 supporting the scintillation counter 25. A rack 26 at the edge of the table 8, together with the worm 28 secured to the arm 24 by means of the shaped member 27, actuates said arm 24. The worm 28 is driven by a flexible shaft 29 which is coupled through the gear wheel 30 with the gear wheel 31 on the shaft 21. If the arm 13 moves in a clockwise direction, the arm 24 moves in the opposite direction. In the position shown in the drawing, the crystal plate 10 and the plate 9 subtend an angle of 90° so that the scintillation counter 25 is situated diametrically with respect to the gas-filled counter tube 14.

The two crystal plates 9 and 10 consist of different materials. The crystal 9 may, for example, consist of tertiary ammonium phosphate. Up to the measuring range of wavelengths, for which the sensitivity of the Geiger-Müller counter is satisfactory, such a crystal may be used without prohibitive attenuation of the reflected radiation due to the increase in angular variation of the position of the crystal. In cooperation with the scintillation counter 25 use is made of a quartz crystal 10. Separation of corresponding wavelengths by means of this crystal requires a crystal shift smaller than in the preceding case.

This permits two measurements to be performed simultaneously so that, after passing through all the angles of deflection, a record is obtained both of the measurement results of the Geiger-Müller counter tube and of the scintillation counter. In both records, a skilled operator is able to recognize in both registrations the optimum indications for use in analysing the radiation spectrum.

Figure 2:
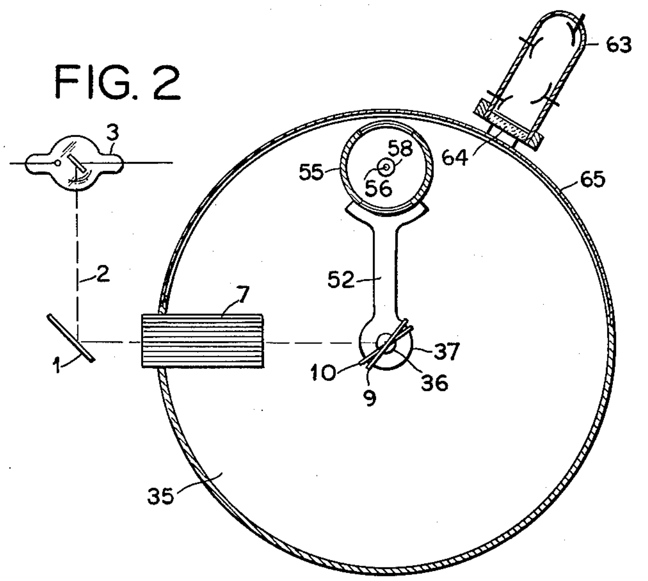
Figure 3:
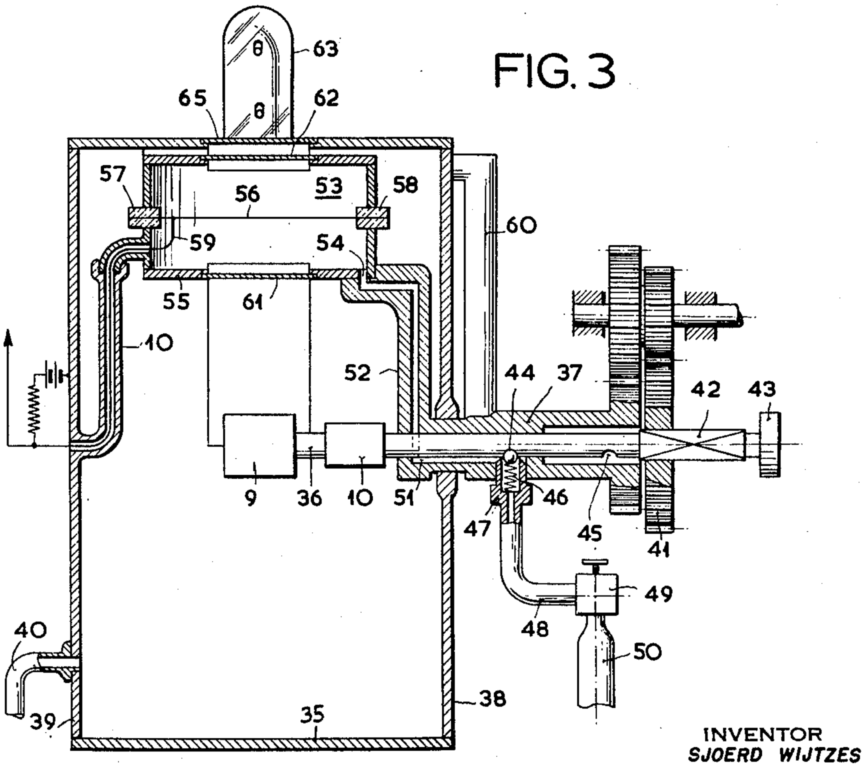

FIG. 2 shows a corresponding device in which the reflection crystals are enclosed in a space defined by the chamber 35 (see FIG. 3). In chamber 35 provision is made of the collimator 7 which, at its protruding end, is covered with a material transparent to the luminescent radiation. For this purpose use may be made of a foil consisting of a suitable plastic such as materials known under the trade names "Mylar" and "Formvar." The first material is a polyester and, in particular, a reaction product of ethylene glycol and terephthalic acid, while the second is polyvinylformal. The object 1 is placed in the radiation cone 2 of the X-ray tube 3 and the fluorescent radiation passing through the directing member 7 is incident on one of the two crystal plates 9 and 10 mounted on a shaft 36. This shaft 36 is rotatable in a hollow shaft 37. These shafts are jointly passed through the bottom 38 of the housing which, together with the chamber 35 and a flat plate 39, defines the space accommodating the crystal plates. This space is connected through a pipe conduit 40 with a vacuum pump for removing the air from the housing. As an alternative, the housing may be filled with helium at a pressure of 1 atmos. or slightly higher in order to be sure that all the air is replaced by the gas used. In this case, the pipe conduit 40 is connected with a container of the gas.

The two concentric shafts 36 and 37 are coupled together through a gearwheel mechanism having a transmission ratio 1 to 2 so that the hollow shaft 37 rotates at an angular speed twice as high as that of the internal shaft 36. The two shafts may be driven from an electric motor (not shown).

The shaft 36 is movable in a longitudinal direction within the hollow shaft 37 and inside the gear wheel 41 forming part of the transmission mechanism. In order for the shaft to be displaceable while preventing the gear wheel 41 from rotating about the shaft, the end 42 of the shaft 36 has a square portion 42 fitting in a square hole of the gear wheel 41. At the same end the shaft 36 is provided with a knob 43 for displacing it. By moving the shaft 36 to the left, the crystal plate 10 is exposed to the fluorescent radiation, while the crystal plate 9 is excluded. The shaft 36 has two recesses 44 and 45 permitting it to be secured in position by means of a snap ball lock 46. The housing 47 for this locking device constitutes the end of a pipe conduit 48 which is connected to the control valve 49 of a gas bottle 50.

Through this conduit 48 a current of gas can be passed to a duct 51 recessed in the hollow shaft 37 and extending into the arm 52 which is integral of the hollow shaft 37 and serves as a support for the Geiger-Müller counter tube 53. The duct 51 in the arm 52 is connected through an opening 54 in the wall 55 of the counter tube with the interior of the counter tube. The wall 55 is cylindrical and may consist of chrome iron. It constitutes the cathode of the counter tube, the anode of which is a thin tungsten wire 56. The latter is secured in insulators 57 and 58 provided in the metal end walls closing the cylindrical cathode 55 at both ends. Connected to the anode 56 is an electric supply conductor 59 which is passed to the outside through tubing 60 consisting of flexible insulating material. The connection of the gas-filled space of the counter tube with the open air through the tubing 60 permits a current of gas to be maintained in the counter tube.

The counter tube has a window 61, the opening of which is closed by means of a plate consisting of a material by which the reflected radiation is only slightly absorbed. For this purpose a foil of the aforesaid materials "Mylar" or "Formvar" may be used. These materials are not perfectly air-tight so that, at a higher pressure prevailing in the space outside the counter tube, the filling gas of the counter tube might be contaminated. Circulation of the filling gas permits this disadvantage to be avoided. Opposite the window 61 provision is made of a second window 62 which is closed in the same manner and transmits radiation not absorbed by the filter gas in order to prevent the measuring accuracy of the counter tube being adversely affected by photo-electric wall effects in the case of said radiation not used being incident on an absorbing wall.

The crystal plate 10 and the crystal plate 9 subtend a small angle. When this crystal plate 10 is brought into the beam of fluorescent radiation by displacing the shaft 36, the reflected radiation passes by the Geiger-Müller counter tube. The scintillation counter 63 is positioned in the direction of the rays deflected by this plate. In order that the radiation may reach the scintillation crystal 64 in any position of the counter, the wall of chamber 35 is provided with a slit window extending over half the circumference of the housing. The scintillation counter 63 is supported by an arm 66 which forms part of the hollow shaft 37 so that it is rotated together with this shaft. The counter 63 moves along the periphery of the window 65 at double the angular speed at which the crystal plate 10 rotates. This permits measurements to be performed at will either with the Geiger-Müller counter tube 53 or with the scintillation counter 63, while passing over from one measuring chamber to the other by shifting the shaft 36. The scintillation counter consists of the combination of a crystal plate and a photo-electric secondary-emission amplifier, the construction of which is known per se, so that it will not further be referred to.

In order to prevent sagging of the thin plastic windows of the Geiger-Müller counter tube and in the wall of the housing due to different pressures prevailing at both sides, provision may be made of supporting nylon wires which are connected to the wall along the edges of the windows. A rubber-containing adhesive may be used for their attachment.

What is claimed is:

1. Apparatus for analyzing a substance to determine the constituent elements thereof, comprising means to expose a specimen of said substance to X-radiation, means to detect fluorescent X-radiation emerging from said specimen comprising a first detector responsive to wave-lengths of radiation shorter than a given wave-length and a second detector responsive to wave-lengths of X-radiation longer than said given wave-length, and means to selectively reflect fluorescent X-radiation of different wave-lengths to said detector means, said reflecting means comprising a first crystal having a given lattice constant for reflecting X-radiation of one wave-length to said first detector, a second crystal for reflecting X-radiation of a longer wave-length to said second detector, said second crystal portion having a lattice constant which is different than that of said first crystal portion, said crystals being rotatably positioned about a given axis at an angle relative to each other and moveable in the direction of the axis of rotation whereby they can successively intercept the fluorescent radiation and reflect said wave-lengths respectively into said first and second detectors.

2. Apparatus for analyzing a substance into its constituent elements, comprising means to expose a specimen of said substance to X-radiation, a gas-filled counter tube positioned to receive fluorescent X-radiation generated by said specimen, a scintillation counter positioned to receive fluorescent radiation generated by said specimen, a first crystal having a given lattice constant, a second crystal having a lattice constant different from that of said first crystal, said crystals being positioned at a given angle with respect to each other, and being rotatable about a common axis and moveable in the direction of the axis of rotation whereby they can successively intercept the fluorescent radiation, said crystals being oriented relative to the specimen to reflect radiation of different wave-lengths to each of said gas-filled counter tube and said scintillation counter.

3. Apparatus for analyzing a substance into its constituent elements, comprising a chamber, means within said chamber to expose a specimen of said substance to said X-radiation, a gas-filled counter tube positioned within said chamber to detect fluorescent X-radiation generated by said specimen, a scintillation counter positioned outside the chamber to detect fluorescent radiation generated by said specimen, a pair of concentric shafts, one of said shafts being hollow and surrounding the other shaft, a pair of crystals each having a different lattice constant for reflecting fluorescent radiation of different wave-lengths supported by the inner shaft, one of said crystals being positioned to intercept fluorescent radiation from said specimen, means to move the inner shaft in an axial direction to displace the crystals relative to the fluorescent radiation, and two radial arms secured to said hollow shaft, one of which supports the gas-filled counter tube within the chamber, the other arm supporting the scintillation counter located outside said chamber.

4. Apparatus as claimed in claim 3 in which the gas-filled counter tube is connected to a supply vessel which contains gas required for the counter tube, the gas being supplied through a conduit permitting free rotation of the holder for the counter tube.

5. Apparatus as claimed in claim 3 in which the gas-filled counter tube is provided with a window and the chamber is provided with a window, both of which comprise a plastic foil supported by nylon threads which are secured to the wall along the edges of the windows.

6. Apparatus for analyzing a substance to determine the constituent elements thereof comprising, means to expose a specimen of said substance to X-radiation, a gas-filled counter tube positioned to detect fluorescent X-radiation generated by said specimen, a scintillation counter positioned to detect fluorescent radiation generated by said specimen, a pair of concentric shafts, one of said shafts being hollow and surrounding the other shaft, a pair of crystals each having a different lattice constant for detecting X-radiation of wave-lengths supported by the inner shaft, one of said crystals being positioned to intercept fluorescent radiation from said specimen, means to move the inner shaft in an axial direction to displace the crystals relative to the fluorescent radiation, and two radial arms secured to said hollow shaft, one of which supports the gas-filled counter the other arm supporting the scintillation counter.

References Cited in the file of this patent

UNITED STATES PATENTS

| | | |
|---|---|---|
| 2,602,142 | Meloy | July 1, 1952 |
| 2,835,820 | Birks | May 20, 1958 |